United States Patent
Hachiya et al.

(10) Patent No.: US 11,799,405 B2
(45) Date of Patent: Oct. 24, 2023

(54) CONTROL DEVICE FOR AC ROTARY MACHINE AND CONTROL METHOD FOR AC ROTARY MACHINE

(71) Applicant: Mitsubishi Electric Corporation, Tokyo (JP)

(72) Inventors: Yosuke Hachiya, Tokyo (JP); Masato Ito, Tokyo (JP); Akihiro Maruyama, Tokyo (JP); Kunihiro Kawahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 17/432,943

(22) PCT Filed: Apr. 23, 2019

(86) PCT No.: PCT/JP2019/017118
§ 371 (c)(1),
(2) Date: Aug. 23, 2021

(87) PCT Pub. No.: WO2020/217291
PCT Pub. Date: Oct. 29, 2020

(65) Prior Publication Data
US 2022/0173678 A1    Jun. 2, 2022

(51) Int. Cl.
*H02P 1/04* (2006.01)
*H02P 6/18* (2016.01)

(52) U.S. Cl.
CPC .......... *H02P 6/183* (2013.01); *H02P 2203/11* (2013.01); *H02P 2207/05* (2013.01)

(58) Field of Classification Search
CPC .......... H02P 6/183; H02P 21/18; H02P 21/26; H02P 2207/05; H02P 2203/11

USPC ...................................................... 318/400.33
See application file for complete search history.

(56) References Cited

U.S. PATENT DOCUMENTS

| | | | | |
|---|---|---|---|---|
| 2012/0001573 A1* | 1/2012 | Kimpara | ............. | H02P 21/0003 318/400.02 |
| 2014/0368135 A1* | 12/2014 | Ito | ........................... | H02P 6/183 318/400.02 |
| 2017/0201200 A1* | 7/2017 | Hachiya | ................... | H02P 6/16 |

FOREIGN PATENT DOCUMENTS

| JP | 3882728 B2 | 2/2007 |
|---|---|---|
| JP | 6104021 B2 | 3/2017 |

OTHER PUBLICATIONS

International Search Report and Written Opinion dated Jul. 23, 2019, received for PCT Application PCT/JP2019/017118, Filed on Apr. 23, 2019, 6 pages including English Translation.

* cited by examiner

*Primary Examiner* — Kawing Chan
*Assistant Examiner* — Gabriel Agared
(74) *Attorney, Agent, or Firm* — XSENSUS LLP

(57) ABSTRACT

In sensorless control for a rotary machine, when variations in inductances for U, V, W phases due to manufacturing error are great, imbalance occurs among detected currents for the respective phases. Thus, estimation error of a magnetic pole position of a rotor increases, so that positioning accuracy is reduced. Correction filters for imparting gains in accordance with rotary machine constants for the respective phases are provided to control means or magnetic pole position calculation means, thereby correcting the imbalance occurring among the detected currents for the respective phases.

20 Claims, 8 Drawing Sheets

CONTROL DEVICE FOR AC ROTARY MACHINE AND CONTROL METHOD FOR AC ROTARY MACHINE

CROSS-REFERENCE TO RELATED APPLICATION

The present application is based on PCT filing PCT/JP2019/017118, filed Apr. 23, 2019, the entire contents of which are incorporated herein by reference.

TECHNICAL FIELD

The present disclosure relates to a control device for an AC rotary machine and a control method for an AC rotary machine.

BACKGROUND ART

As a method for detecting the rotor position of an AC rotary machine without using a position sensor, there is known a method in which, separately from voltage for controlling rotation of the AC rotary machine, high-frequency voltage for detecting a rotor phase is applied to detect the position of the rotary machine (for example, Patent Document 1). In this method, saliency of the inductance of the rotary machine which varies in a sinusoidal shape with a cycle that is two times one cycle of the rotor is used to detect a magnetic pole position of the rotary machine.

According to disclosure in Patent Document 1, high-frequency current for each phase is extracted from current for each phase detected by a current sensor, using a high-pass filter or the like, and three-phase high-frequency power commands for causing three-phase high-frequency currents to coincide with high-frequency target currents are outputted. Then, the magnetic pole position is calculated from a spatial vector of the three-phase high-frequency power commands.

CITATION LIST

Patent Document

Patent Document 1: Japanese Patent No. 3882728

SUMMARY OF THE INVENTION

Problems to be Solved by the Invention

In Patent Document 1, current for each phase is detected by the current sensor in order to calculate the magnetic pole position. However, if there are manufacturing variations among rotary machines, variations in inductances for the respective phases are increased due to manufacturing error, so that the inductance does not have ideal sinusoidal characteristics. Thus, detection accuracy of the magnetic pole position is eventually reduced, leading to reduction in positioning accuracy in position control of the rotary machine.

The present disclosure has been made to solve the above problem, and an object of the present disclosure is to obtain an AC electric motor control device that improves detection accuracy of the magnetic pole position in position control.

Solution to the Problems

An AC rotary machine control device according to the present disclosure includes: control means which generates fundamental voltage commands for driving a rotary machine, generates high-frequency voltage commands for estimating a magnetic pole position of a rotor of the rotary machine, and calculates voltage commands using the fundamental voltage commands and the high-frequency voltage commands; voltage application means for applying voltage to the rotary machine on the basis of the voltage commands; current detection means for detecting currents for respective phases of the rotary machine; magnetic pole position calculation means which extracts high-frequency currents for the respective phases from the detected currents of the rotary machine, and calculates an estimated position of the magnetic pole position; and an imbalance adjustor for adjusting imbalance among the high-frequency currents for the respective phases, wherein the magnetic pole position calculation means calculates the estimated position of the magnetic pole of the rotor of the rotary machine, using the high-frequency currents for which the imbalance has been adjusted.

Effect of the Invention

In the AC rotary machine control device according to the present disclosure, gains for correcting the imbalance are imparted to current detection values for the three phases, whereby the current imbalance is corrected. Thus, position estimation accuracy is improved and positioning accuracy is also improved.

DESCRIPTION OF EMBODIMENTS

Figure 1:
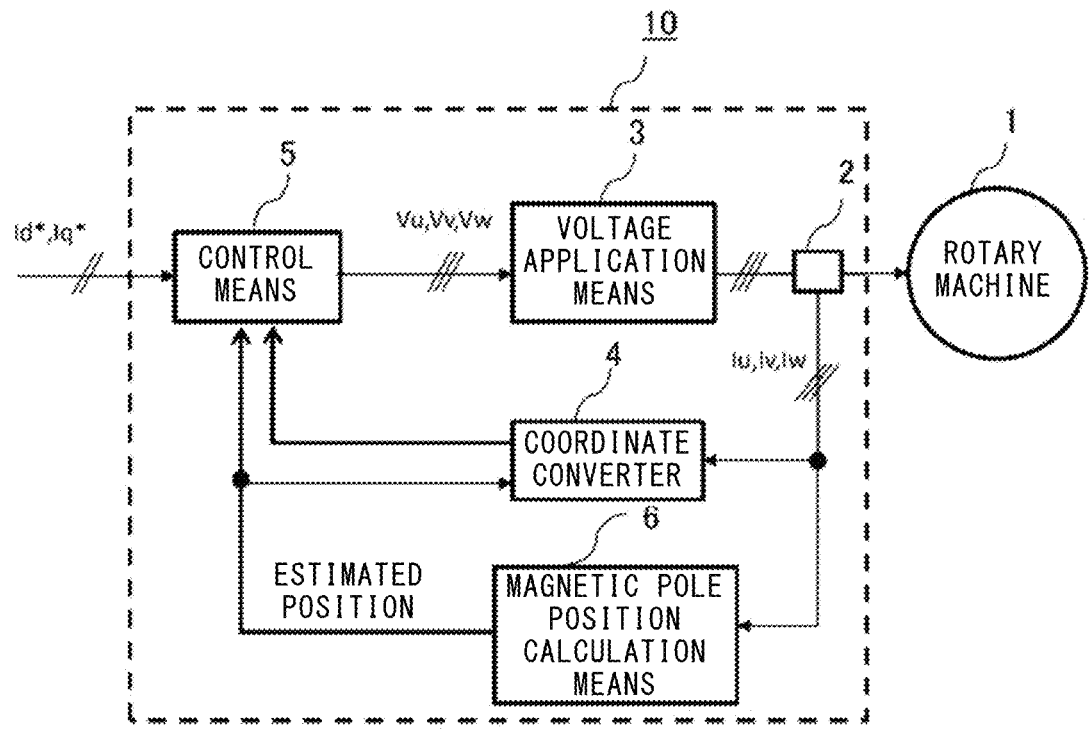
FIG. 1 is a block diagram showing the configuration of a rotary machine control device according to embodiment 1.

Hereinafter, embodiments will be described with reference to the drawings. In the drawings, the same reference characters denote the same or corresponding parts.

Embodiment 1

A rotary machine control device according to embodiment 1 will be described with reference to the drawings. FIG. 1 is a diagram showing the configuration of the rotary machine control device according to embodiment 1. Hereinafter, operation of each constituent part will be described in detail on the basis of this configuration diagram.

A rotary machine 1 is a synchronous machine that is an AC rotary machine, and in the present embodiment, is a synchronous machine having a permanent magnet. Although the configuration in which a synchronous machine having a permanent magnet is used as the rotary machine is described as an example in the present embodiment, a synchronous machine such as a reluctance motor may be used. With the same configuration as in the present embodiment, using an imbalance adjustor 62 and the like described later, it is possible to correct imbalance among high-frequency currents.

A control device 10 includes: current detection means 2 which is connected to the rotary machine 1 and detects rotary machine current (three-phase current vector) flowing through the rotary machine 1; voltage application means 3 which is formed by a power converter such as an inverter circuit and applies voltage to the rotary machine 1 on the basis of a voltage command outputted from control means 5; magnetic pole position calculation means 6 for calculating a magnetic pole position using the detected current vector detected by the current detection means 2; and a coordinate converter 4 which performs coordinate conversion of the detected current vector detected by the current detection means 2, using an estimated position of the magnetic pole position calculated by the magnetic pole position calculation means 6, and outputs the result to the control means 5.

Hereinafter, each constituent part of the control device 10 will be described in detail.

The current detection means 2 detects a three-phase detected current vector (Iu, Iv, Iw) of the rotary machine 1.

The coordinate converter 4 performs coordinate conversion of the three-phase detected current vector (Iu, Iv, Iw) detected by the current detection means 2, to currents in a dq-axis coordinate system, by using the estimated position outputted from the magnetic pole position calculation means 6 described later, and outputs the converted currents as a detected current vector (Ids, Iqs). It is noted that the dq-axis coordinate system is an orthogonal coordinate system which is converted from a coordinate system at rest with axes for three phases (U, V, W) and rotates synchronously with a rotor of the rotary machine, and is a known coordinate system.

The three-phase detected current vector may be obtained by detecting all of the three-phase currents, or may be obtained by detecting currents for two phases and using the fact that the sum of the three-phase currents is zero. Alternatively, the three-phase detected current vector may be obtained through calculation from bus current of the inverter which is the voltage application means 3, current flowing through a switching element composing the inverter, the state of the switching element, and the like.

Figure 2:
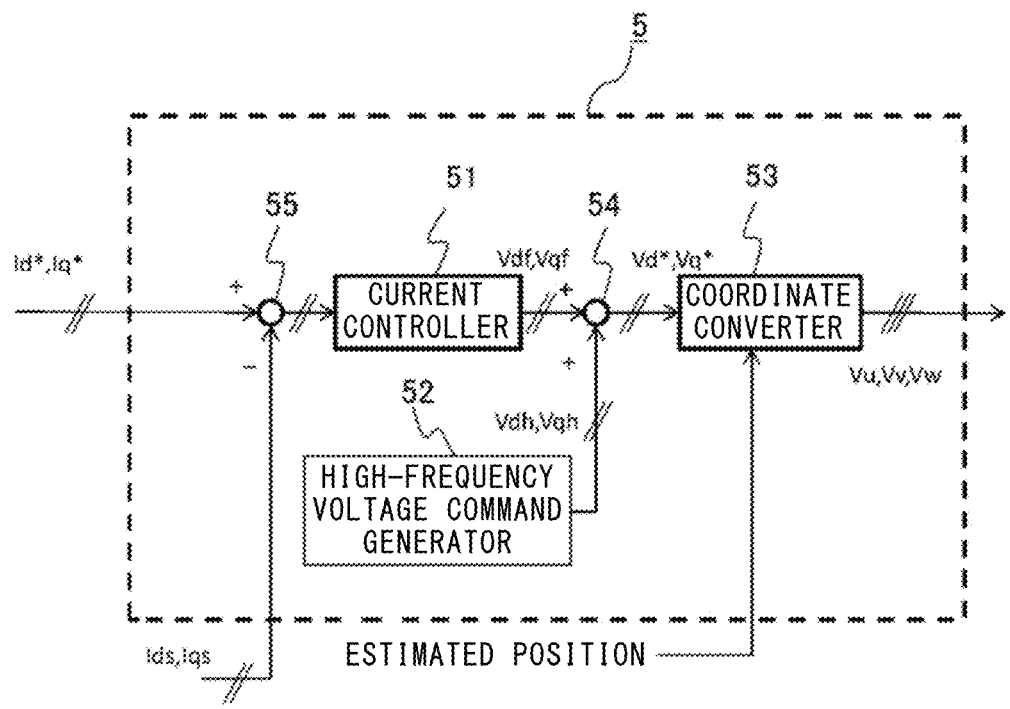
FIG. 2 is a block diagram showing the configuration of control means according to embodiment 1.

FIG. 2 is a diagram showing the configuration of the control means 5. In FIG. 2, the control means 5 includes a current controller 51, a high-frequency voltage command generator 52, a coordinate converter 53, an adder 54, and an adder/subtractor 55.

The adder/subtractor 55 subtracts the detected current vector (Ids, Iqs) from the current command vector (Id*, Iq*), to calculate a current deviation, and outputs the current deviation.

The current controller 51 outputs a fundamental voltage command vector (Vdf, Vqf) by PI control so that the current deviation inputted from the adder/subtractor 55 becomes zero. The fundamental voltage command vector is a drive command for rotational operation of the synchronous machine.

The high-frequency voltage command generator 52 generates a high-frequency voltage command vector (Vdh, Vqh) for d axis and q axis. The high-frequency voltage command vector has a higher frequency than the fundamental voltage command vector.

The adder 54 adds the fundamental voltage command vector (Vdf, Vqf) and the high-frequency voltage command vector (Vdh, Vqh), to output voltage commands (Vd*, Vq*).

The coordinate converter 53 converts (Vd*, Vq*) outputted from the adder 54, to a voltage command vector (Vu, Vv, Vw) in a coordinate system at rest from the dq-axis coordinate system, by using the estimated position outputted from the magnetic pole position calculation means 6, and outputs the voltage command vector (Vu, Vv, Vw).

Next, operation of the magnetic pole position calculation means 6 will be described.

Figure 3:
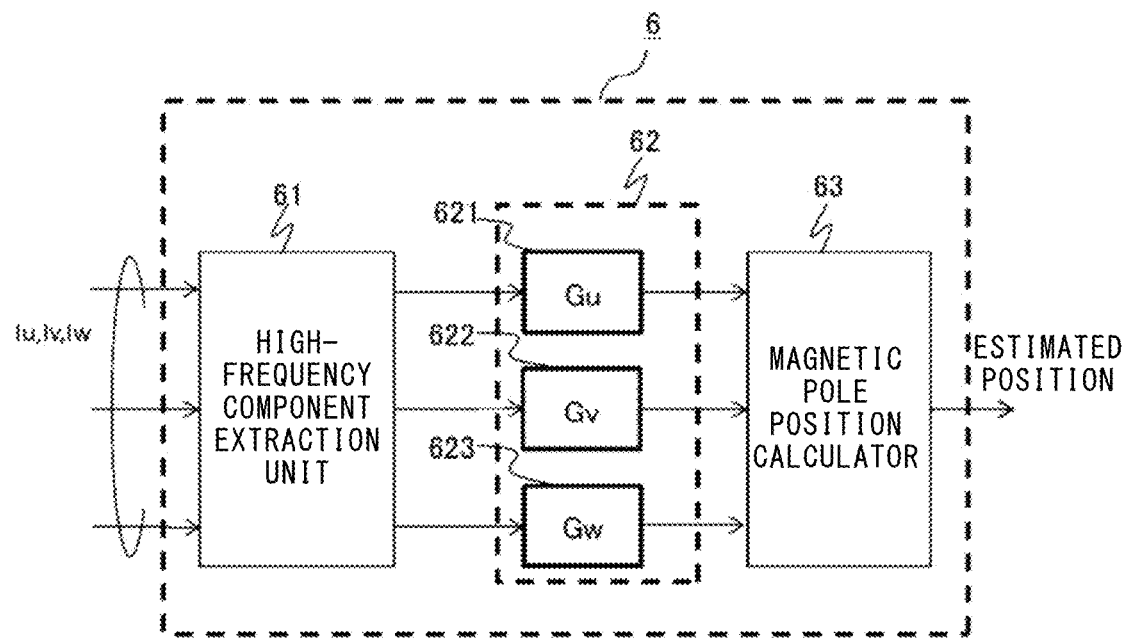
FIG. 3 is a block diagram showing the configuration of magnetic pole position calculation means according to embodiment 1.

FIG. 3 is a diagram showing the configuration of the magnetic pole position calculation means 6. In FIG. 3, the magnetic pole position calculation means 6 includes a high-frequency component extraction unit 61, the imbalance adjustor 62, and a magnetic pole position calculator 63.

The three-phase detected current vector (Iu, Iv, Iw) detected by the current detection means 2 is inputted to the high-frequency component extraction unit 61, and the high-frequency component extraction unit 61 extracts high-frequency components for the respective phases and outputs a high-frequency current vector (Iuh, Ivh, Iwh) for the respective phases.

The imbalance adjustor 62 includes filters 621, 622, 623 corresponding to the respective phases, and corrects current imbalance in the high-frequency current vector (Iuh, Ivh, Iwh) for the respective phases.

The magnetic pole position calculator 63 calculates an estimated position of the magnetic pole position, using the corrected high-frequency current vector.

The imbalance among the high-frequency currents for the respective phases occurs because of presence of a difference in the inductance values for the U, V, W phases due to manufacturing error of the rotary machine. If there is no such difference, a d-axis inductance Ld and a q-axis inductance Lq converted into a dq-axis coordinate system have constant values irrespective of the rotor position. However, if the difference is great, the d-axis inductance Ld and the q-axis inductance Lq are distorted in a sinusoidal shape with a cycle that is two times one cycle of the rotor. Thus, position estimation accuracy is reduced. Therefore, as in the present embodiment, the filters for correcting the imbalance are applied to the high-frequency currents for the respective phases, whereby it is possible to prevent reduction in the position estimation accuracy.

Figure 4:
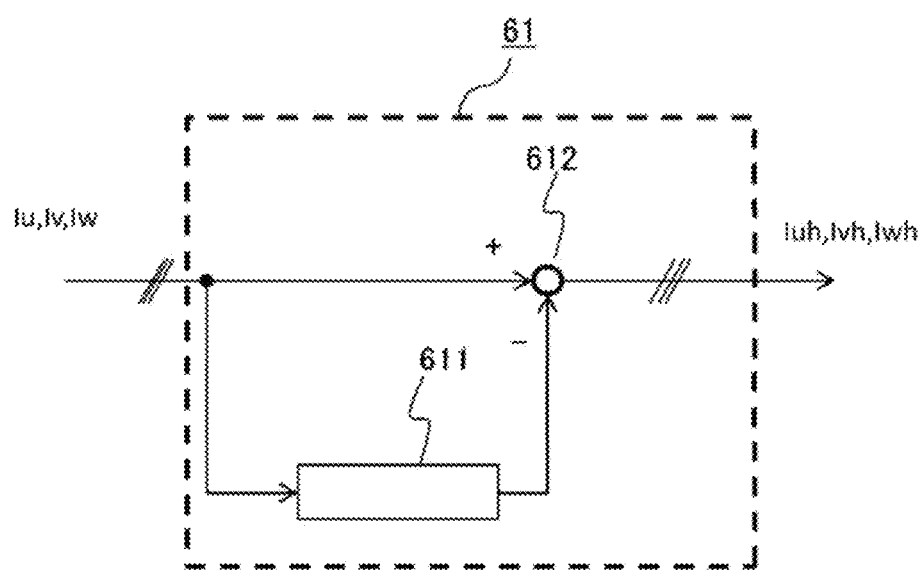
FIG. 4 is a block diagram showing the configuration of a high-frequency component extraction unit according to embodiment 1.

FIG. 4 shows a control block diagram of the high-frequency component extraction unit 61. The high-frequency component extraction unit 61 extracts the high-frequency current vector (Iuh, Ivh, Iwh) from the detected current vector (Iu, Iv, Iw) by using a filter 611. As the filter 611, any filter may be used as long as the same frequency components as the high-frequency voltage vector can be extracted from the detected current vector. For example, a notch filter which is known as a band-stop filter having a narrow bandwidth may be used to extract the high-frequency current vector.

With an example in which a notch filter is used as the filter 611 in FIG. 4, operation of the high-frequency component extraction unit 61 will be described. The notch filter (filter 611) is represented by the following Expression (1), and components having an angular frequency $\omega_h$ of the high-frequency voltage vector are removed by this filter. The detected current vector (Iu, Iv, Iw) inputted to the high-frequency component extraction unit 61 is subjected to the notch filter (filter 611), so that the angular frequency $\omega_h$ components are removed. An adder/subtractor 612 subtracts the output of the filter 611 from the detected current vector (Iu, Iv, Iw), thereby calculating the high-frequency current vector (Iuh, Ivh, Iwh) of the angular frequency $\omega_h$ components from the detected current vector (Iu, Iv, Iw). In Expression (1), s is the Laplace operator, and qx is the depth of notch.

[Mathematical 1]

$$\frac{s^2 + \omega_h^2}{s^2 + \frac{\omega_h}{q_x}s + \omega_h^2} \quad (1)$$

The high-frequency voltage command vector generated by the high-frequency voltage command generator 52 described in FIG. 2 can be represented as a high-frequency rotating voltage vector as shown by Expression (2).

[Mathematical 2]

$$\begin{aligned} V_{dh} &= V_h \cos\omega_h t \quad (2\text{-}1) \\ V_{qh} &= V_h \sin\omega_h t \quad (2\text{-}2) \end{aligned} \quad (2)$$

While the high-frequency rotating voltage vector is used in the above Expression (2), Vqh may be set to 0 in Expression (2-1) of Expression (2), and thus a voltage vector that alternates only in the d-axis direction may be used. In the present embodiment 1, the voltage vector that alternates only in the d-axis direction is used in the high-frequency voltage command generator 52.

As described above, the high-frequency currents for the U, V, W phases are unbalanced by variations in the inductance values for the U, V, W phases due to manufacturing variations and the like. Therefore, the high-frequency currents for the U, V, W phases of the high-frequency current vector (Iuh, Ivh, Iwh) extracted by the high-frequency component extraction unit 61 are unbalanced. The filters 621, 622, 623 provided in the imbalance adjustor 62 shown in FIG. 3 correct difference among the high-frequency currents for the U, V, W phases of the high-frequency current vector (Iuh, Ivh, Iwh) extracted by the high-frequency component extraction unit 61.

Next, a value Gu of the filter 621, a value Gv of the filter 622, and a value Gw of the filter 623 will be described.

First, in a state in which the phase of the N pole of the rotor of the rotary machine 1 is matched with each of the U, V, W phases, the high-frequency current amplitude for each phase when a voltage vector alternating only in the d-axis direction is applied can be represented as shown by Expression (3). In the following expressions, superscripts indicate that the values are measured in a state in which the phase of the N pole of the rotor is matched in the direction of each phase.

[Mathematical 3]

$$\begin{aligned} I_{dh}^u &= \frac{V_h}{R^u + sL_d^u} \\ I_{dh}^v &= \frac{V_h}{R^v + sL_d^v} \\ I_{dh}^w &= \frac{V_h}{R^w + sL_d^w} \end{aligned} \quad (3)$$

where
$R^u$, $R^v$, $R^w$ are the resistance values when the phase of the N pole of the rotor of the rotary machine is matched with each of the U, V, W phases,
$L_d^u$, $L_d^v$, $L_d^w$ are the inductances when the phase of the N pole of the rotor of the rotary machine is matched with each of the U, V, W phases, and
s is the Laplace operator.

Here, the inductances in a dq coordinate system are considered, but the filters may be configured using inductances in a coordinate system at rest for the three phases.

Using the high-frequency current amplitude for each phase represented by Expression (3), the ratio thereof to a certain current amplitude as a reference is taken, and the reciprocal thereof is a correction gain for each phase. This value is used as the value of the filter provided for each phase. The phase as the reference may be any phase. Here, among the high-frequency current amplitudes of the rotary machine to be detected, the U-phase high-frequency current amplitude is used as the reference. In this case, the value Gu of the filter 621 is represented by Expression (4), the value Gv of the filter 622 is represented by Expression (5), and the value Gw of the filter 623 is represented by Expression (6).

[Mathematical 4]

$$G_u = \frac{1}{I_{dh}^u / I_{dh}^u} = \frac{R^u + sL_d^u}{R^u + sL_d^u} \quad (4)$$

[Mathematical 5]

$$G_v = \frac{1}{I_{dh}^v / I_{dh}^u} = \frac{R^v + sL_d^v}{R^u + sL_d^u} \quad (5)$$

[Mathematical 6]

$$G_w = \frac{1}{I_{dh}^w / I_{dh}^u} = \frac{R^w + sL_d^w}{R^u + sL_d^u} \quad (6)$$

In a case where the angular velocity of the high-frequency voltage command vector generated by the high-frequency voltage command generator 52 is sufficiently great so that R<<sL is satisfied, the influence of the stator resistance of the rotary machine can be neglected. In this case, the value Gu of the filter 621 is represented by Expression (7), the value Gv of the filter 622 is represented by Expression (8), and the value Gw of the filter 623 is represented by Expression (9). Here, the values of the filters 621, 622, 623 are proportionality constants, and when one phase is used as a reference, the filter for the high-frequency current corresponding to the reference phase is represented as a factor of 1. Thus, a configuration for reducing the calculation amount of a calculator can be achieved. It is noted that the filter for the high-frequency current corresponding to the reference phase may be omitted.

[Mathematical 7]

$$G_u = \frac{L_d^u}{L_d^u} \tag{7}$$

[Mathematical 8]

$$G_v = \frac{L_d^v}{L_d^u} \tag{8}$$

[Mathematical 9]

$$G_w = \frac{L_d^w}{L_d^u} \tag{9}$$

The values to be set for the filters 621, 622, 623 may be either the values of Expression (4), Expression (5), and Expression (6), or the values of Expression (7), Expression (8), and Expression (9). Values obtained by subjecting the high-frequency current vector (Iuh, Ivh, Iwh) to the filters 621, 622, 623, i.e., multiplying the high-frequency current vector (Iuh, Ivh, Iwh) by the correction gains, become a high-frequency corrected current vector (Iuh_flt, Ivh_flt, Iwh_flt).

Figure 5:
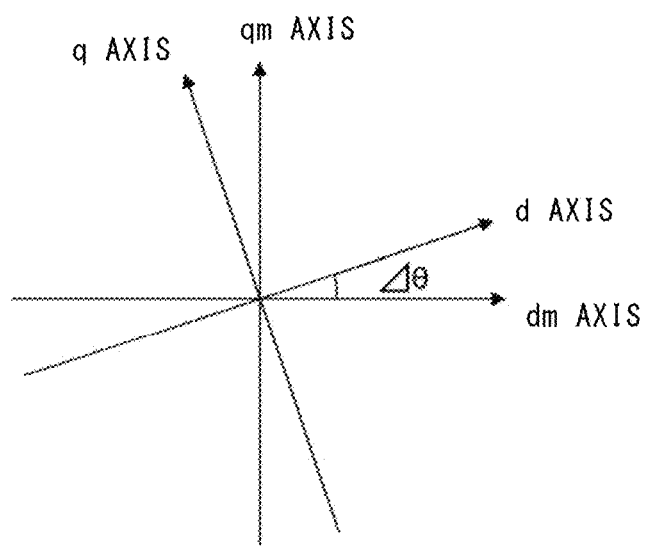
FIG. 5 illustrates rotor magnetic flux vectors according to embodiment 1.

Next, the magnetic pole position calculator 63 will be described. The magnetic pole position calculator 63 calculates an estimated magnetic pole position θ0 of the rotary machine 1 on the basis of the corrected high-frequency current vector and rotary machine constants (stator resistance R, stator inductance L, etc.) stored in advance. First, a calculation method for the estimated magnetic pole position θ0 of the rotary machine 1 will be described. FIG. 5 shows the directions of the rotor magnetic flux and the voltage command vector applied, in embodiment 1. In FIG. 5, the magnetic flux vector direction of the rotor is defined as dm axis, the direction orthogonal thereto is defined as qm axis, the direction indicated by an estimated magnetic pole position θ0 obtained by applying a high-frequency alternating voltage vector is defined as d axis, the direction orthogonal thereto is defined as q axis, and it is assumed that there is a deviation of ΔΘ between d axis and dm axis.

In order to calculate ΔΘ which is the deviation between the direction (dm axis) of the rotor magnetic flux vector and the direction (d axis) indicated by the estimated magnetic pole position θ0 from high-frequency current obtained by applying high-frequency voltage, the following Expression (10) may be used on the basis of a method described in Japanese Patent No. 6104021, for example. It is noted that, in the present embodiment, instead of a "q-axis high-frequency current amplitude" in the known document, a "high-frequency q-axis corrected current amplitude" is calculated using the high-frequency corrected current amplitude corrected by the imbalance adjustor 62, and the "high-frequency q-axis corrected current amplitude" is used for calculating ΔΘ.

[Mathematical 10]

$$\Delta\theta = \frac{\sin^{-1}\left(\frac{|I_{qh\_flt}|\omega_h(L^2 - l^2)}{V_h l}\right)}{2} \tag{10}$$

where $$L = \frac{L_d + L_q}{2}, l = \frac{L_q - L_d}{2}$$

$L_d$ is the inductance in the dm-axis direction,
$L_q$ is the inductance in the qm-axis direction, and
$|I_{qh\_flt}|$ is the q-axis high-frequency corrected current amplitude.

In Expression (10), the angular frequency ωh of the high-frequency voltage and a high-frequency voltage amplitude Vh can be arbitrarily set in the high-frequency voltage command generator 52 and therefore are known values. In addition, L and 1 can be calculated from Ld, Lq which can be obtained through measurement in advance, and therefore are known values. Further, an integrator 634 described later operates so that ΔΘ approaches zero in a steady state, that is, 2ΔΘ≈0 is satisfied and therefore approximation can be made as sin 2ΔΘ≈2ΔΘ. Thus, the following Expression (11) is derived from Expression (10).

[Mathematical 11]

$$\Delta\theta = \frac{|I_{qh\_flt}|\omega_h(L^2 - l^2)}{2V_h l} \tag{11}$$

Figure 6:
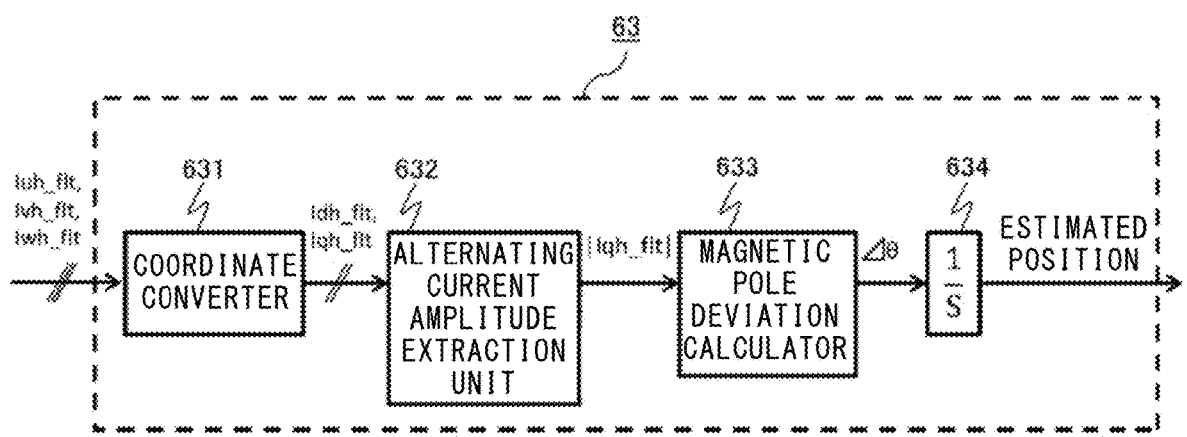
FIG. 6 is a block diagram illustrating a magnetic pole position calculator according to embodiment 1.

FIG. 6 is a diagram showing the configuration of the magnetic pole position calculator 63. In FIG. 6, the magnetic pole position calculator 63 includes a coordinate converter 631, an alternating current amplitude extraction unit 632, a magnetic pole deviation calculator 633, and the integrator 634.

First, the coordinate converter 631 performs coordinate conversion of the high-frequency corrected current vector (Iuh_flt, Ivh_flt, Iwh_flt) outputted from the imbalance adjustor 62, to currents in a dq-axis coordinate system, using the estimated position outputted from the magnetic pole position calculation means 6, and outputs the resultant vector as a high-frequency corrected current vector (Idh_flt, Iqh_flt).

Next, the alternating current amplitude extraction unit 632 calculates an amplitude |Iqh_flt| using the following Expression (12), from the q-axis component Iqh_flt of the high-frequency corrected current vector (Idh_flt, Iqh_flt) inputted from the coordinate converter 631. In Expression (12), T is the cycle of Iqh_flt.

[Mathematical 12]

$$I_{qh\_flt} = \sqrt{\frac{2}{T}\int_0^T I_{qh\_flt}^2 dt} \tag{12}$$

The magnetic pole deviation calculator 633 calculates the deviation ΔΘ, using either Expression (10) or Expression (11), from the amplitude |Iqh_flt| calculated and extracted by the alternating current amplitude extraction unit 632.

The calculated deviation Δθ is subjected to integral calculation by the integrator 634, whereby the estimated magnetic pole position θ0 is calculated.

The configuration shown in embodiment 1 is a configuration of only a current control system. However, in a case of constructing a speed control system, an estimated speed co can be calculated by differentiating the estimated magnetic pole position θ0, and the speed control system can be configured by adding a PI controller.

Figure 7:
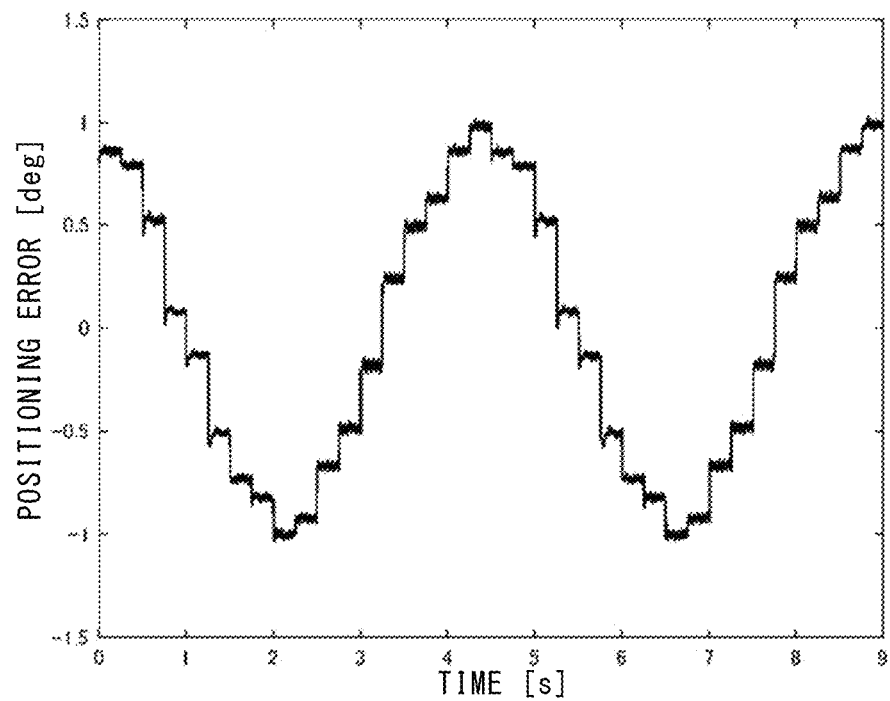
FIG. 7 is a graph showing a comparative example illustrating a difference (position error) between an actual magnetic pole position and a position command, relevant to embodiment 1.
Figure 8:
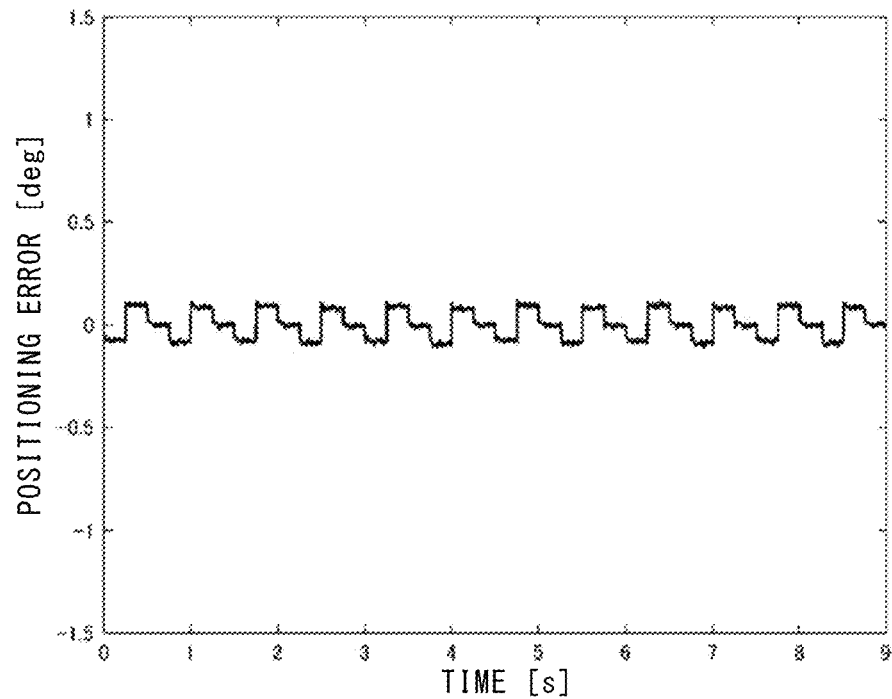
FIG. 8 is a graph illustrating position error in a case of using correction of imbalance among high-frequency currents according to embodiment 1 and performing sensorless position control.

FIG. 7 and FIG. 8 are graphs showing a difference (position error) between an actual magnetic pole position and a position command while an AC rotary machine is rotated by one revolution in a case where the AC rotary machine is operated by sensorless position control. FIG. 7 shows position error in an example in which the configuration of the present embodiment is not used, and FIG. 8 shows position error in a case of performing correction of imbalance among the high-frequency currents for the respective phases according to the present embodiment 1 and operating the rotary machine by sensorless position control.

FIG. 8 shows a result in a case where imbalance among currents for the respective phases is reduced by about 5% through imbalance correction for the high-frequency currents for the respective phases in embodiment 1, and it is found that positioning error is reduced by as much as about 90% from 2 to 0.2 [deg] as compared to FIG. 7.

As described above, according to the present embodiment 1, in the magnetic pole position calculation means 6, gains for correcting imbalance among the high-frequency currents for the respective phases are imparted using the high-frequency current amplitudes for the respective phases, whereby current imbalance among the respective phases is reduced and detection accuracy for the magnetic pole position of the rotary machine is improved. In addition, by controlling the AC rotary machine on the basis of the estimated position of the magnetic pole calculated as described above, it becomes possible to improve positioning accuracy even in a case of performing position control operation of the rotary machine without using a position sensor.

Figure 9:
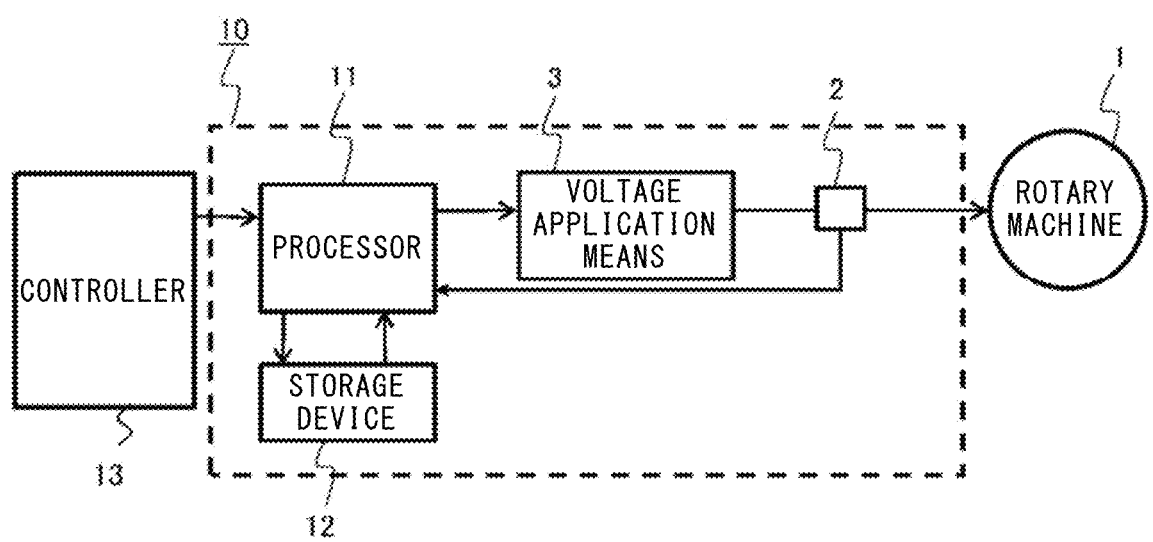
FIG. 9 is a block diagram showing the hardware configuration of a rotary machine system including the rotary machine control device according to embodiment 1.

FIG. 9 shows the hardware configuration of a rotary machine system including the control device 10 for the AC rotary machine 1 according to the above embodiment 1.

As shown in FIG. 9, the rotary machine system includes the rotary machine 1, the control device 10 for the rotary machine 1, and a high-order controller 13 for providing a command to the control device 10, and drives the rotary machine 1. The control device 10 includes, as a hardware configuration, a processor 11, a storage device 12, the current detection means 2, and the voltage application means 3.

The control means 5, the coordinate converter 4, and the magnetic pole position calculation means 6 shown in FIG. 1 are implemented by the processor 11 executing a program stored in the storage device 12.

The storage device 12 includes a volatile storage device such as a random access memory, and a nonvolatile auxiliary storage device such as a flash memory, although not shown. Instead of the nonvolatile auxiliary storage device, an auxiliary storage device of a hard disk or the like may be provided.

The program is inputted from the auxiliary storage device of the storage device 12 to the processor 11 via the volatile storage device, and the processor 11 executes the program inputted from the storage device 12. In addition, the processor 11 outputs data such as a calculation result to the volatile storage device of the storage device 12, or outputs and stores such data into the auxiliary storage device via the volatile storage device.

The control means 5, the coordinate converter 4, and the magnetic pole position calculation means 6 may be implemented by a processing circuit such as a system LSI.

The coordinate converter 4 and the function of converting the voltage commands Vd*, Vq* for the voltage application means 3 to three-phase voltage commands may be implemented by the processor 11 or a processing circuit such as a system LSI. Further, a plurality of processors 11 and a plurality of storage devices 12 may cooperate to execute the above functions, or a plurality of processing circuits may cooperate to execute the above functions. In addition, these may be combined to execute the above functions.

Embodiment 2

The above embodiment 1 has shown the method of directly performing correction of current imbalance by imparting gains (providing filters) to high-frequency currents in the magnetic pole position calculation means 6. In the present embodiment 2, a method of performing correction of imbalance in the high-frequency current vector (Iuh, Ivh, Iwh) by applying correction filters to the high-frequency voltage command vector to be superimposed in the control means 5, instead of performing correction for the detected currents, will be described. In the configuration diagram of the rotary machine control device shown in FIG. 1 in embodiment 1, the control means 5 is changed to a configuration shown in FIG. 10. The other configurations are the same as in the above embodiment, and the description thereof is omitted.

Figure 10:
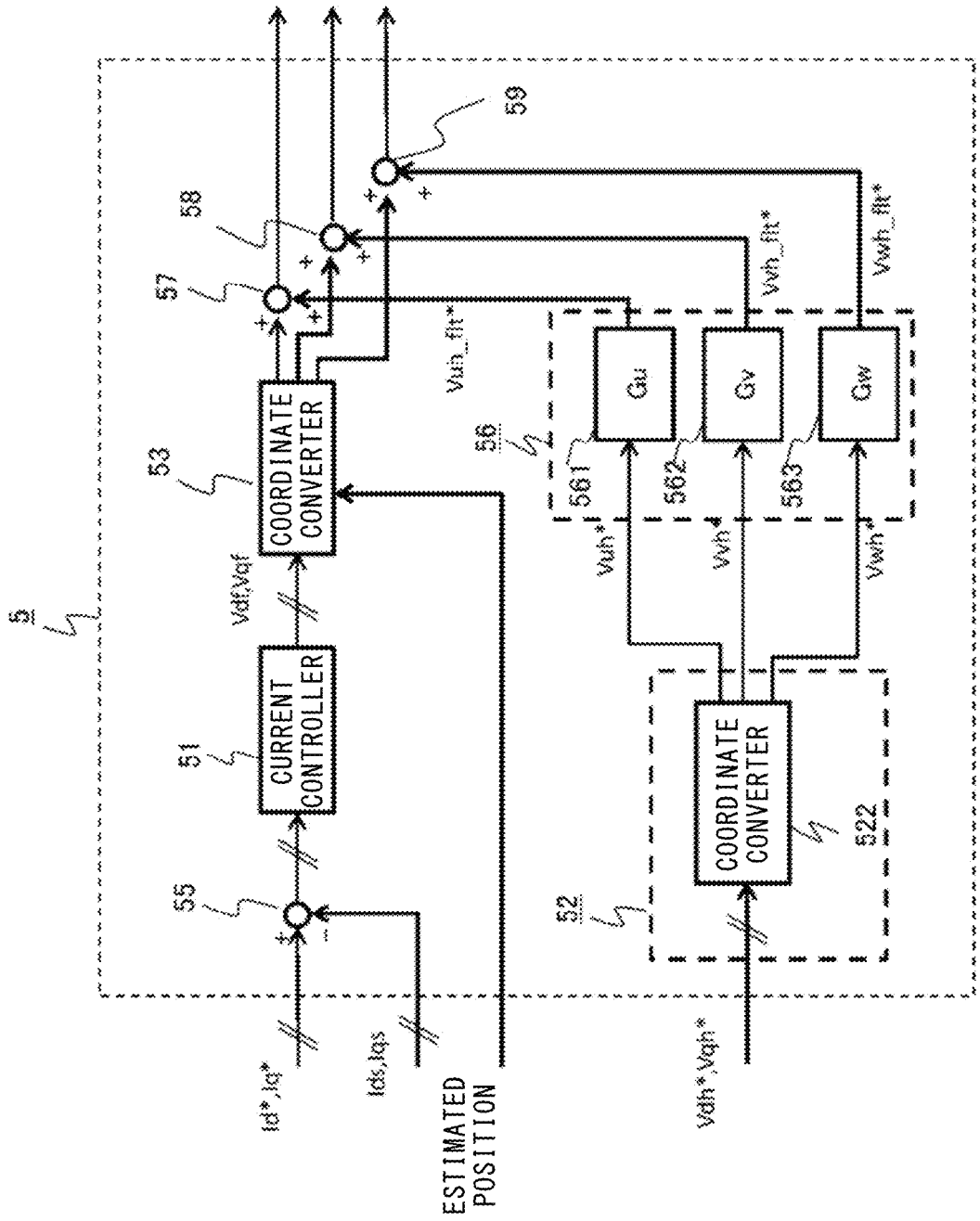
FIG. 10 is a block diagram showing the configuration of control means according to embodiment 2.

FIG. 10 is a block diagram showing the configuration of the control means 5 in the rotary machine control device according to embodiment 2. In FIG. 10, the control means 5 includes the current controller 51, the high-frequency voltage command generator 52, the coordinate converter 53, an imbalance adjustor 56, the adder/subtractor 55, and adders 57, 58, 59. Further, the high-frequency voltage command generator 52 includes a coordinate converter 522, and the imbalance adjustor 56 includes filters 561, 562, 563.

The coordinate converter 522 converts a high-frequency voltage command vector (Vdh*, Vqh*) to a high-frequency voltage command vector (Vuh*, Vvh*, Vwh*) in a coordinate system at rest from a dq-axis coordinate system, and outputs the high-frequency voltage command vector (Vuh*, Vvh*, Vwh*).

The high-frequency voltage command vector (Vuh*, Vvh*, Vwh*) inputted to the imbalance adjustor 56 is subjected to imbalance correction, so as to be converted to a high-frequency corrected voltage command vector (Vuh_flt*, Vvh_flt*, Vwh_flt*).

Meanwhile, the adder/subtractor 55 subtracts the detected current vector (Ids, Iqs) from the current command vector (Id*, Iq*), to calculate the current deviation, and outputs the current deviation.

The current controller 51 outputs the fundamental voltage command vector (Vdf, Vqf) by PI control so that the current deviation inputted from the adder/subtractor 55 becomes zero.

The coordinate converter 53 converts the fundamental voltage command vector (Vdf, Vqf) outputted from the current controller 51, to a fundamental voltage command vector (Vuf, Vvf, Vwf) in a coordinate system at rest from a dq-axis coordinate system, by using the estimated position outputted from the magnetic pole position calculation means 6, and outputs the fundamental voltage command vector (Vuf, Vvf, Vwf).

The adders 57, 58, 59 respectively add the fundamental voltage command vector (Vuf, Vvf, Vwf) and the high-frequency corrected voltage command vector (Vuh_flt*, Vvh_flt*, Vwh_flt*) outputted from the imbalance adjustor 56, and thereby outputs a voltage command vector for the respective phases in a coordinate system at rest for which the high-frequency components have been corrected.

With reference to FIG. 1, voltages are applied from the voltage application means 3 to the rotary machine 1 on the basis of the voltage command vector for the respective phases in a coordinate system at rest which are outputted from the control means 5 and for which the high-frequency components have been corrected, as described above, and currents for the U, V, W phases are detected by the current detection means 2. At this time, high-frequency components have been already corrected for the voltage command vector for the respective phases, and therefore imbalance among the currents for the respective phases have been reduced. As a result, a highly accurate magnetic pole position can be calculated in the magnetic pole position calculation means.

Next, correction processing by the imbalance adjustor 56 will be described.

A difference (imbalance) occurs among the respective phases of the high-frequency current vector (Iuh, Ivh, Iwh), due to imbalance occurring among the inductance values for the U, V, W phases. The filters 561, 562, 563 of the imbalance adjustor 56 have a role of correcting the high-frequency voltage command vector (Vuh*, Vvh*, Vwh*) with respect to the voltage command vector to be outputted to the voltage application means 3, so that imbalance does not occur in the high-frequency current vector (Iuh, Ivh, Iwh).

Here, a case where the angular velocity of the high-frequency voltage command vector generated by the high-frequency voltage command generator 52 is sufficiently great so that R<<sL is satisfied, is assumed. In this case, the stator winding resistance can be neglected. However, considering the influence thereof, the filters may be configured so as to include the stator winding phase resistance as in embodiment 1.

A value Gu of the filter 561, a value Gv of the filter 562, and a value Gw of the filter 563 will be described.

First, in a state in which the phase of the N pole of the rotor of the rotary machine 1 is matched with each of the U, V, W phases, the high-frequency voltage amplitudes for the respective phases when high-frequency alternating voltage is applied can be represented by the following Expression (13).

[Mathematical 13]

$$V_{dh}^u = \frac{|I_{dh}^u|}{sL_d^u}$$
$$V_{dh}^v = \frac{|I_{dh}^v|}{sL_d^v}$$
$$V_{dh}^w = \frac{|I_{dh}^w|}{sL_d^w}$$

(13)

where
$|I_{dh}^u| = |I_{dh}^v| = |I_{dh}^w|$

Using the high-frequency voltage amplitude for each phase represented by Expression (13), the ratio thereof to the high-frequency voltage amplitude for a certain phase as a reference is taken, and the reciprocal thereof is used as the gain imparted for each phase, which becomes the value of the filter. The phase as the reference may be any phase. Here, the U-phase high-frequency voltage amplitude is used as the reference, and in this case, the value Gu of the filter 561 is represented by Expression (14), the value Gv of the filter 562 is represented by Expression (15), and the value Gw of the filter 563 is represented by Expression (16).

[Mathematical 14]

$$G_u = \frac{1}{V_{dh}^u / V_{dh}^u} = \frac{L_d^u}{L_d^u}$$

(14)

[Mathematical 15]

$$G_v = \frac{1}{V_{dh}^v / V_{dh}^u} = \frac{L_d^v}{L_d^u}$$

(15)

[Mathematical 16]

$$G_w = \frac{1}{V_{dh}^w / V_{dh}^u} = \frac{L_d^w}{L_d^u}$$

(16)

The filters 561, 562, 563 set as described above are applied, whereby the high-frequency voltage command vector (Vuh*, Vvh*, Vwh*) is subjected to imbalance correction, and thus the high-frequency corrected voltage command vector (Vuh_flt*, Vvh_flt*, Vwh_flt*) is outputted. The control means 5 outputs the voltage command vector for which the high-frequency corrected voltage command vector (Vuh_flt*, Vvh_flt*, Vwh_flt*) is considered, whereby imbalance among the respective phases of the high-frequency current vector (Iuh, Ivh, Iwh) is reduced and accuracy of magnetic pole position detection is improved.

In the present embodiment, the filters 621, 622, 623 of the imbalance adjustor 62 provided in the magnetic pole position calculation means 6 shown in FIG. 3 in embodiment 1 may be set to a factor of 1, so that correction is not performed in the imbalance adjustor 62. However, in order to enhance accuracy of current imbalance adjustment, both of the imbalance adjustor 56 and the imbalance adjustor 62 may be set accordingly.

As described above, according to the present embodiment 2, in the control means 5, correction of the high-frequency voltage commands is performed using the high-frequency voltage amplitudes for the respective phases, whereby imbalance among the respective phases occurring in the high-frequency current vector is corrected. Thus, current imbalance among the respective phases is reduced and detection accuracy for the magnetic pole position of the rotary machine is improved. In addition, by controlling the AC rotary machine on the basis of the estimated position of the magnetic pole calculated as described above, it becomes possible to improve positioning accuracy even in a case of performing position control operation of the rotary machine without using a position sensor.

Embodiment 3

In embodiment 3, a sequence for acquiring filter coefficients in the imbalance adjustors in embodiment 1 and embodiment 2 will be described.

Figure 11:
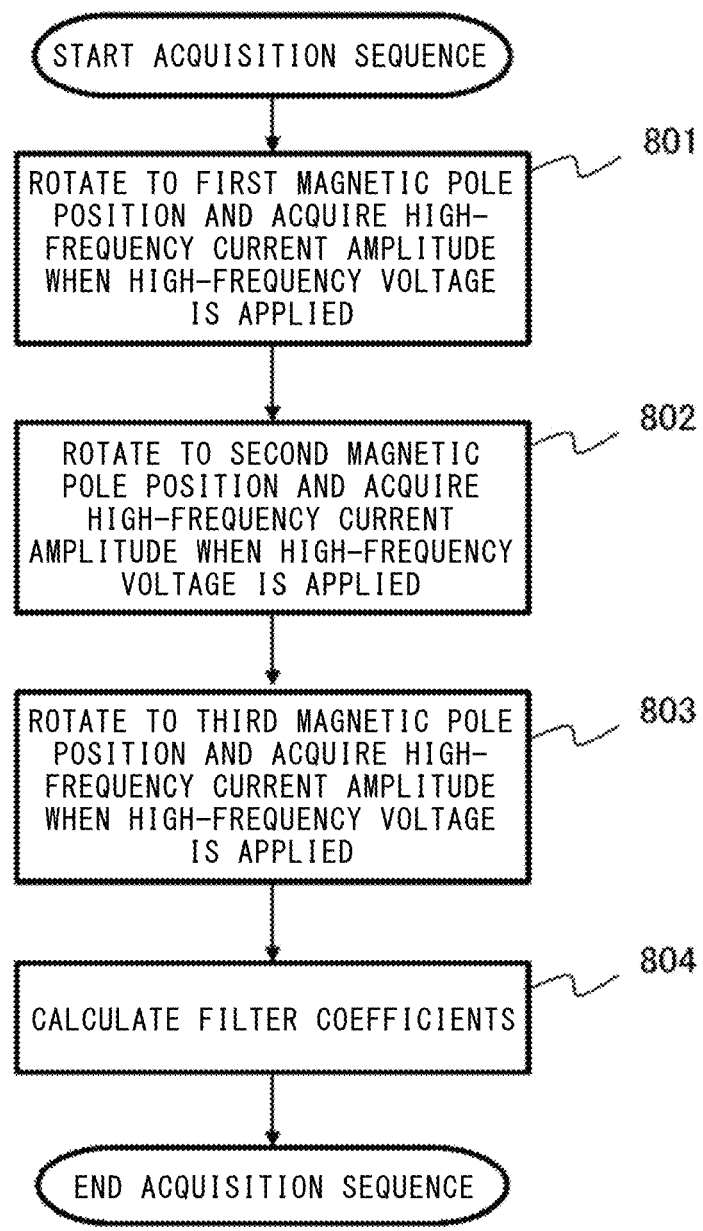
FIG. 11 is a block diagram illustrating a filter coefficient acquisition sequence according to embodiment 3, in a case of using the configuration of embodiment 1.

FIG. 11 is a flowchart showing the acquisition sequence in a case of setting coefficients for the filters 621, 622, 623 of the imbalance adjustor 62 in the magnetic pole position calculation means 6, in the configuration of embodiment 1.

First, in step 801, DC current is applied at a phase that is a first magnetic pole position of the rotary machine 1 by the control means 5, and the N pole of the rotor is rotated to the first magnetic pole position. After the rotating operation is finished, high-frequency alternating voltage or high-frequency rotating voltage is applied to the rotary machine 1 by the control means 5, and the amplitude of high-frequency current is measured by the current detection means 2.

In step 802, DC current is applied at a phase that is a second magnetic pole position of the rotary machine 1 by the control means 5, and the N pole of the rotor is rotated to the second magnetic pole position. After the rotating operation is finished, high-frequency alternating voltage or high-frequency rotating voltage is applied to the rotary machine 1 by the control means 5, and the amplitude of high-frequency current is measured by the current detection means 2.

In step 803, DC current is applied at a phase that is a third magnetic pole position of the rotary machine 1 by the control means 5, and the N pole of the rotor is rotated to the third magnetic pole position. After the rotating operation is finished, high-frequency alternating voltage or high-frequency rotating voltage is applied to the rotary machine 1 by the control means 5, and the amplitude of high-frequency current is measured by the current detection means 2.

The operations in step 801 to step 803 are the same operation except that the magnetic pole positions are different. In addition, each of the first magnetic pole position, the second magnetic pole position, and the third magnetic pole position is a phase position in any of the U, V, W phases, and the measurement order is optional.

The above measurement for the high-frequency current amplitude is performed in the order from the first magnetic pole position set in advance. However, a rotary machine rotor position at the time of executing the acquisition sequence in FIG. 11 may be measured, and measurement for the high-frequency current amplitude may be started from a phase at the closest measurement point. For example, in a case where the initial rotor position when the sequence is started is close to the V phase, the measurement is started from the V phase. In this way, the acquisition sequence may be started from the measurement point that is closest to the present rotor position.

Next, in step 804, calculation of Expression (7), Expression (8), and Expression (9) is performed using the high-frequency current amplitudes acquired in step 801 to step 803. After the calculation is completed, the obtained values are set for the filters 621, 622, 623 provided in the imbalance adjustor 62.

Next, the acquisition sequence in a case of setting coefficients for the filters 561, 562, 563 of the imbalance adjustor 56 in the control means 5 in the configuration of embodiment 2 will be described with reference to FIG. 12. Here, in the sequence for acquiring coefficients of the filters 561, 562, 563 of the imbalance adjustor 56, the control means 5 uses the control configuration shown in FIG. 2. At this time, the high-frequency voltage command generator 52 includes an adder/subtractor and a controller. The adder/subtractor subtracts a high-frequency current amplitude vector (|Idh|, 0) calculated on the basis of a detected high-frequency current vector (Idh, 0) from a high-frequency current amplitude command vector (|Idh*|, 0), to calculate an amplitude deviation, and outputs the amplitude deviation. The controller performs control so that the amplitude deviation inputted from the adder/subtractor becomes zero, to calculate a high-frequency voltage amplitude Vh, and outputs a high-frequency voltage vector (Vdh, 0). The high-frequency current amplitude command may be set to an arbitrary value, and may be set in advance to 5% of the rotary machine rated current, for example.

Figure 12:
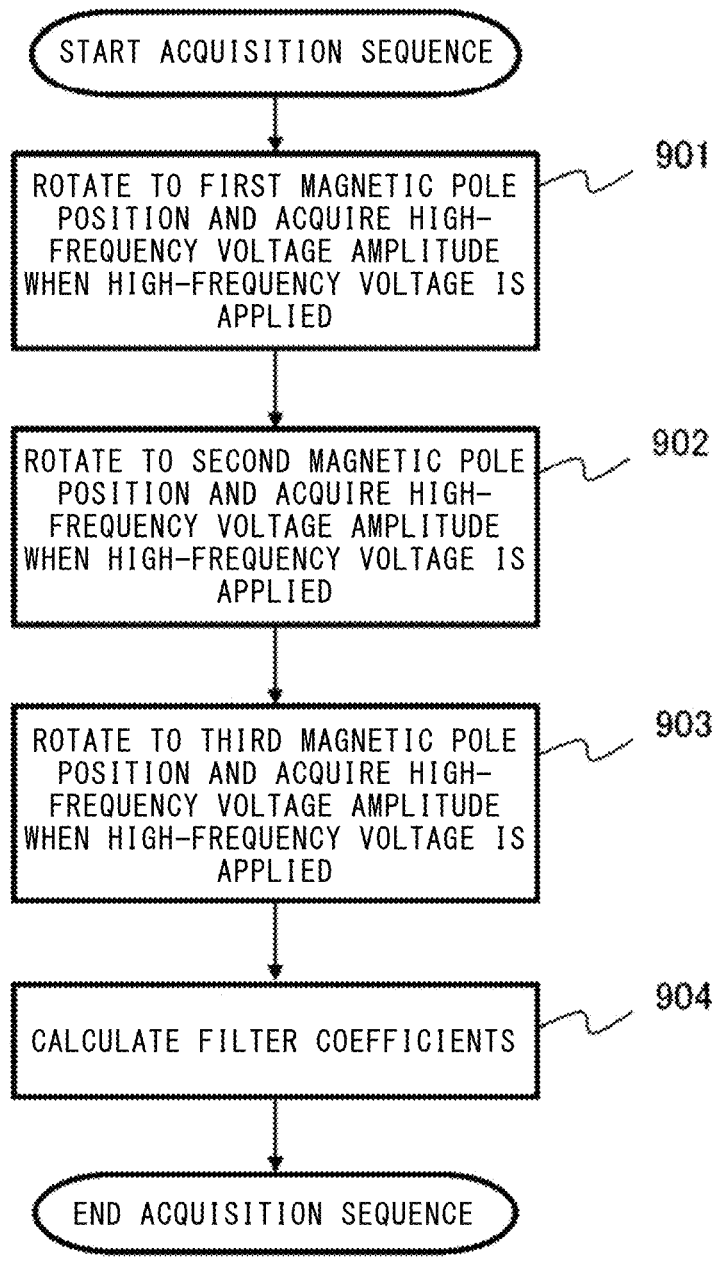
FIG. 12 is a block diagram illustrating a filter coefficient acquisition sequence according to embodiment 3, in a case of using the configuration of embodiment 2.

FIG. 12 is a flowchart showing the sequence for acquiring coefficients of the filters of the imbalance adjustor 56 in the control means 5.

First, in step 901, DC current is applied at a phase that is a first magnetic pole position of the rotary machine 1 by the control means 5, and the N pole of the rotor is rotated to the first magnetic pole position. After the rotating operation is finished, the control means 5 generates the high-frequency voltage amplitude so that the high-frequency current amplitude coincides with the high-frequency current amplitude command, and acquires the high-frequency voltage amplitude at the first magnetic pole position. The high-frequency voltage amplitude may be calculated in the same manner as in the case of extracting the amplitude |Iqh_flt| from the q-axis component Iqh_flt by using Expression (12).

In step 902, DC current is applied at a phase that is a second magnetic pole position of the rotary machine 1 by the control means 5, and the N pole of the rotor is rotated to the second magnetic pole position. After the rotating operation is finished, the control means 5 generates the high-frequency voltage amplitude so that the high-frequency current amplitude coincides with the high-frequency current command, and acquires the high-frequency voltage amplitude at the second magnetic pole position.

In step 903, DC current is applied at a phase that is a third magnetic pole position of the rotary machine 1 by the control means 5, and the N pole of the rotor is rotated to the third magnetic pole position. After the rotating operation is finished, the control means 5 generates the high-frequency voltage amplitude so that the high-frequency current amplitude coincides with the high-frequency current command, and acquires the high-frequency voltage amplitude at the third magnetic pole position.

The operations in step 901 to step 903 are the same operation except that the magnetic pole positions are different. In addition, each of the first magnetic pole position, the second magnetic pole position, and the third magnetic pole position is a phase position in any of the U, V, W phases, and the acquisition order for the high-frequency voltage amplitude is optional.

The above acquisition for the high-frequency current amplitude is performed in the order from the first magnetic pole position set in advance. However, a rotary machine rotor position at the time of executing the acquisition sequence in FIG. 12 may be measured, and the acquisition may be started from a phase at the closest measurement point. For example, in a case where the initial rotor position when the sequence is started is close to the W phase, the acquisition is started from the W phase. In this way, the acquisition sequence may be started from the measurement point that is closest to the present rotor position.

Next, in step 904, calculation of Expression (14), Expression (15), and Expression (16) is performed using the high-frequency voltage amplitudes acquired in steps 901 to 903. After the calculation is completed, the obtained values are set for the filters 561, 562, 563 provided in the imbalance adjustor 56.

In FIG. 11 and FIG. 12, the filters are configured such that the filter values are set by measuring the high-frequency current amplitudes and the high-frequency voltage amplitudes for the respective phases. However, the filters may be configured by measuring the stator resistance value R and the stator inductance L at each of the three magnetic pole positions.

First, regarding measurement for the stator resistance value R, here, a case of measuring a stator resistance value Ru for the U phase will be described.

The phase of the N pole of the rotor of the rotary machine 1 is matched with the U phase and a DC voltage command is provided. At this time, current flowing through the rotary machine is measured, and calculation is performed using the following Expression (17).

[Mathematical 17]

$$R_u = \frac{V_d^u}{I_d^u} \tag{17}$$

where $V_d^u$ is a d-axis voltage command when N pole of the rotor of the rotary machine is matched with the U phase, and $I_d^u$ is d-axis current when the N pole of the rotor of the rotary machine is matched with the U phase.

Also for the other phases, the phase of the N pole of the rotor of the rotary machine 1 is rotated, whereby the measurement can be performed in the same manner.

Next, regarding measurement for the stator inductance L, here, a case of measuring the inductance when the N pole of the rotor is matched with the U phase will be described.

In a state in which the phase of the N pole of the rotor of the rotary machine 1 is matched with the U phase, such high-frequency voltage as to satisfy R<<sL is applied. The high-frequency current amplitude at this time is acquired, and the inductance when the N pole of the rotor is matched with the U phase is calculated using the following Expression (18) derived from the above Expression (3).

[Mathematical 18]

$$L_d^u = \frac{|V_h|}{\omega_h |I_{uh}|} \tag{18}$$

where $L_d^u$ is the inductance when the N pole of the rotor of the rotary machine is matched with the U phase.

Also for the other phases, the phase of the N pole of the rotor of the rotary machine 1 is rotated, whereby the measurement can be performed in the same manner.

As described above, according to the present embodiment 3, the high-frequency current amplitudes or the high-frequency voltage amplitudes are acquired for three magnetic pole positions of the rotary machine, and correction gains for the respective phases are calculated. The acquired gains are used as the values of the filters, whereby imbalance of high-frequency currents is corrected. Thus, even imbalance is reduced and detection accuracy for the magnetic pole position of the rotary machine is improved. In addition, by controlling the AC rotary machine on the basis of the estimated position of the magnetic pole calculated as described above, it becomes possible to improve positioning accuracy even in a case of performing position control operation of the rotary machine without using a position sensor.

Embodiment 4

In the above embodiments 1 to 3, the correction gains which are values to be set for the filters are calculated on the basis of the high-frequency current amplitude or the high-frequency voltage amplitude for a certain phase as a reference, and the filters are configured accordingly, whereby imbalance among the high-frequency currents for the respective phases is corrected. However, this depends on detection accuracy for the high-frequency current amplitude or the high-frequency voltage amplitude for the phase as the reference, and therefore there is a possibility that imbalance among the phases is not sufficiently eliminated.

Accordingly, in the present embodiment 4, an average value of the high-frequency current amplitudes or the high-frequency voltage amplitudes for the respective phases is used in a method for calculating a phase as a reference, thereby achieving further improvement of accuracy in the correction.

First, a case of setting values for the filters of the imbalance adjustor 62 provided in the magnetic pole position calculation means 6 in embodiment 1, will be described. An average value $|I_{ave}|$ of the acquired high-frequency current amplitudes of the rotary machine is calculated using the following Expression (19).

[Mathematical 19]

$$|I_{ave}| = \frac{|I_{dh}^u| + |I_{dh}^v| + |I_{dh}^w|}{3} \tag{19}$$

where $|I_{dh}^u|$, $|I_{dh}^v|$, $|I_{dh}^w|$ are d-axis high-frequency current amplitudes when the N pole et the rotor of the rotary machine is matched with each of the U, V W phases.

The high-frequency current amplitudes for the respective phases may be calculated in the same manner as in the case of extracting the amplitude |Iqh_flt| from the q-axis component Iqh_flt by using Expression (12).

In a case where the amplitude of current as a reference is the average value $|I_{ave}|$ of the high-frequency current amplitudes, Expression (4), Expression (5), and Expression (6) can be rewritten as follows. In the imbalance adjustor 62, the value Gu of the filter 621 is represented by Expression (20), the value Gv of the filter 622 is represented by Expression (21), and the value Gw of the filter 623 is represented by Expression (22).

[Mathematical 20]

$$G_u = \frac{1}{|I_{dh}^u|/|I_{ave}|} \tag{20}$$

[Mathematical 21]

$$G_v = \frac{1}{|I_{dh}^v|/|I_{ave}|} \tag{21}$$

[Mathematical 22]

$$G_w = \frac{1}{|I_{dh}^w|/|I_{ave}|} \tag{22}$$

Next, a case of setting values for the filters of the imbalance adjustor 56 provided in the control means 5 in embodiment 2 will be described. An average value |Vave| of the measured high-frequency voltage amplitudes of the rotary machine is calculated using the following Expression (23).

[Mathematical 23]

$$\|V_{ave}\| = \frac{|V_{dh}^u| + |V_{dh}^v| + |V_{dh}^w|}{3} \quad (23)$$

where $|V_{dh}^u|$, $|V_{dh}^v|$, $|V_{dh}^w|$ are d-axis high-frequency voltage amplitudes when the N pole of the rotor of the rotary machine is matched with each of the U, V, W phases.

In a case where the amplitude of voltage as a reference is the average value |Vave| of the high-frequency voltage amplitudes, Expression (14), Expression (15), and Expression (16) can be rewritten as follows. The value Gu of the filter 561 is represented by Expression (24), the value Gv of the filter 562 is represented by Expression (25), and the value Gw of the filter 563 is represented by Expression (26).

[Mathematical 24]

$$\|G_u = \frac{1}{|V_{dh}^u|/|V_{ave}|} \quad (24)$$

[Mathematical 25]

$$\|G_v = \frac{1}{|V_{dh}^v|/|V_{ave}|} \quad (25)$$

[Mathematical 26]

$$\|G_w = \frac{1}{|V_{dh}^w|/|V_{ave}|} \quad (26)$$

As described above, according to the present embodiment 4, the high-frequency current amplitudes or the high-frequency voltage amplitudes are acquired for three magnetic pole positions, and using the average value of the high-frequency current amplitudes or the high-frequency voltage amplitudes at the three positions as a reference, correction gains are calculated to set the filter values. Thus, the filter values can be set without individually measuring rotary machine constants such as stator resistances R and stator inductances L, and therefore improvement in positioning accuracy can be achieved. In addition, as compared to a case of setting the filter values using the high-frequency current amplitude or the high-frequency voltage amplitude at one certain position as a reference, imbalance among the high-frequency currents of the rotary machine can be corrected more accurately, so that positioning accuracy is improved.

Embodiment 5

In the above embodiments, in order to acquire filter coefficients of the filters, it is necessary to measure the high-frequency current amplitudes or the high-frequency voltage amplitudes for three magnetic pole positions, and this requires some measurement time. In the present embodiment 5, the number of measurement positions for the magnetic pole position is one and thus measurement is easy.

Here, an example in which the phase of the N pole of the rotor of the rotary machine is matched with the U phase and U-phase current of detected currents of the rotary machine is used as a reference to configure the filters, will be described. It is noted that the phase as a reference may be any of the U, V, W phases.

In a case where the N pole of the rotor of the rotary machine 1 is matched with the U phase, V-phase current and W-phase current satisfy relationships of Iv=-Iu/2 and Iw=-Iu/2 with U-phase current. Using the above relationships, Expression (4), Expression (5), and Expression (6) can be rewritten as follows. In the imbalance adjustor 62, the value Gu of the filter 621 is represented by Expression (27), the value Gv of the filter 622 is represented by Expression (28), and the value Gw of the filter 623 is represented by Expression (29).

[Mathematical 27]

$$\|G_u = \frac{1}{|I_{uh}^u|/|I_{uh}^u|} \quad (27)$$

[Mathematical 28]

$$\|G_v = \frac{1}{2 \times |I_{vh}^u|/|I_{uh}^u|} \quad (28)$$

[Mathematical 29]

$$\|G_w = \frac{1}{2 \times |I_{wh}^u|/|I_{uh}^u|} \quad (29)$$

where $|I_{uh}^u|$, $|I_{vh}^v|$, $|I_{wh}^u|$ are high-frequency current amplitudes for the respective phases.

The high-frequency current amplitudes for the respective phases may be calculated in the same manner as in the case of extracting the amplitude |Iqh_flt| from the q-axis component Iqh_flt by using Expression (12).

As described above, according to the present embodiment 5, the high-frequency current amplitude is acquired for one of three magnetic pole positions, and on the basis thereof, the filter values for the three phases are set. Thus, the filter values can be set without individually measuring rotary machine constants such as stator resistances R and stator inductances L, and therefore it becomes easy to correct imbalance among the high-frequency currents. Thus, current imbalance can be corrected and detection accuracy for the magnetic pole position of the rotary machine is improved. In addition, by controlling the AC rotary machine on the basis of the estimated position of the magnetic pole calculated as described above, it becomes possible to improve positioning accuracy even in a case of performing position control operation of the rotary machine without using a position sensor.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotary machine
2 current detection means
3 voltage application means
4, 53, 522, 631 coordinate converter
5 control means
6 magnetic pole position calculation means
10 control device
11 processor
12 storage device
13 controller
51 current controller
52 high-frequency voltage command generator
55, 612 adder/subtractor
54, 57, 58, 59 adder
56, 62 imbalance adjustor
61 high-frequency component extraction unit
63 magnetic pole position calculator
561, 562, 563, 621, 622, 623 filter
632 alternating current amplitude extraction unit
633 magnetic pole deviation calculator
611 filter
634 integrator

The invention claimed is:

1. An AC rotary machine control device comprising:
controller which generates fundamental voltage commands for driving a rotary machine, generates high-frequency voltage commands for estimating a magnetic pole position of a rotor of the rotary machine, and calculates voltage commands using the fundamental voltage commands and the high-frequency voltage commands;
voltage applyer to apply voltage to the rotary machine on the basis of the voltage commands;
a current detector to detect currents for respective phases of the rotary machine;
a magnetic pole position calculator which extracts high-frequency currents for the respective phases from the detected currents of the rotary machine, and calculates an estimated position of the magnetic pole position; and
an imbalance adjustor to adjust imbalance among the high-frequency currents for the respective phases based on adjustment gain amounts determined using one of the high-frequency currents for the respective phases as a reference for other high-frequency currents of other phases, wherein
the magnetic pole position calculator calculates the estimated position of the magnetic pole of the rotor of the rotary machine, using the high-frequency currents for which the imbalance has been adjusted.

2. The AC rotary machine control device according to claim 1, wherein the imbalance adjustor imparts gains based on rotary machine constants for the respective phases of the rotary machine to the high-frequency currents for the respective phases, to adjust the imbalance among the high-frequency currents for the respective phases.

3. The AC rotary machine control device according to claim 2, wherein the gains are proportionality constants.

4. The AC rotary machine control device according to claim 1, wherein the imbalance adjustor imparts gains based on rotary machine constants for the respective phases to, of the high-frequency voltage commands, high-frequency voltage commands for at least two phases, to adjust the imbalance among the high-frequency currents for the respective phases.

5. The AC rotary machine control device according to claim 4, wherein the gains are proportionality constants.

6. The AC rotary machine control device according to claim 1, wherein the adjustment gain amounts are determined as a reciprocals of ratios of the high-frequency currents of the other phases to the reference.

7. The AC rotary machine control device according to claim 1, wherein the imbalance adjustor adjusts for the imbalance among the high-frequency currents for the respective phases at a point of extraction of the high-frequency currents for the respective phases.

8. The AC rotary machine control device according to claim 7, wherein the imbalance adjustor adjusts for the imbalance among the high-frequency currents of the respective phases via a plurality of filters including one filter for each phase, the adjustment gain amounts being used as parameters for the plurality of filters.

9. The AC rotary machine control device according to claim 1, wherein the imbalance adjustor adjusts for the imbalance among the high-frequency currents of the respective phases at a point of coordinate conversion of the voltage commands.

10. The AC rotary machine control device according to claim 9, wherein the imbalance adjustor adjusts for the imbalance among the high-frequency currents of the respective phases via a plurality of filters including one filter for each phase, the adjustment gain amounts being used as parameters for the plurality of filters.

11. The AC rotary machine control device according to claim 10, wherein outputs of the plurality of filters are summed to a result of the coordinate conversion of the voltage commands.

12. The AC rotary machine control device according to claim 11, wherein the coordinate conversion of the voltage commands converts the voltage commands from dq commands to uvw commands.

13. The AC rotary machine control device according to claim 1, wherein the controller generates the fundamental commands for driving the rotary machine using PI control.

14. The AC rotary machine control device according to claim 1, wherein the rotary machine control device performs sensor-less control of the rotary machine.

15. The AC rotary machine control device according to claim 1, wherein the voltage applyer includes an inverter circuit.

16. The AC rotary machine control device according to claim 1, wherein the respective phases include three phases.

17. The AC rotary machine control device according to claim 1, wherein the magnetic pole position calculator extracts the high-frequency currents for the respective phases using notch filters.

18. An AC rotary machine control method comprising:
rotating the rotor of the rotary machine to a first magnetic pole position and applying high-frequency voltage based on the high-frequency voltage command, to acquire a high-frequency current amplitude at the first magnetic pole position;
calculating high-frequency current amplitudes for second and third magnetic pole positions on the basis of the acquired high-frequency current amplitude at the first magnetic pole position, and calculating gains based on rotary machine constants for the respective phases;

imparting the calculated gains based on the rotary machine constants for the respective phases, to adjust the imbalance among the high-frequency currents for the respective phases of the rotary machine; and calculating the estimated position of the magnetic pole of the rotor of the rotary machine using the adjusted high-frequency currents, and driving the rotary machine on the basis of the estimated position of the magnetic pole.

19. An AC rotary machine control method comprising:

rotating a rotor of the rotary machine to a first magnetic pole position and applying high-frequency voltage based on high-frequency voltage command, to acquire a high-frequency current amplitude at the first magnetic pole position;

rotating the rotor of the rotary machine to a second magnetic pole position and applying high-frequency voltage based on the high-frequency voltage command, to acquire a high-frequency current amplitude at the second magnetic pole position;

rotating the rotor of the rotary machine to a third magnetic pole position and applying high-frequency voltage based on the high-frequency voltage command, to acquire a high-frequency current amplitude at the third magnetic pole position;

calculating gains based on rotary machine constants for the respective phases, on the basis of the acquired high-frequency current amplitudes at the respective magnetic pole positions;

imparting the calculated gains based on the rotary machine constants for the respective phases, to adjust the imbalance among the high-frequency currents for the respective phases of the rotary machine; and calculating an estimated position of the magnetic pole of the rotor of the rotary machine using the adjusted high-frequency currents, and driving the rotary machine on the basis of the estimated position of the magnetic pole.

20. The AC rotary machine control method according to claim 19, wherein in adjusting the imbalance among the high-frequency currents for the respective phases of the rotary machine, gains calculated on the basis of an average value of the acquired high-frequency current amplitudes for the respective phases are imparted, to adjust the imbalance among the high-frequency currents for the respective phases.

\* \* \* \* \*